Jan. 24, 1967 R. N. DU SHANE 3,299,575
COMBINED CORNER AND ROLLER FOR SCREEN FRAMES
Filed Sept. 7, 1965
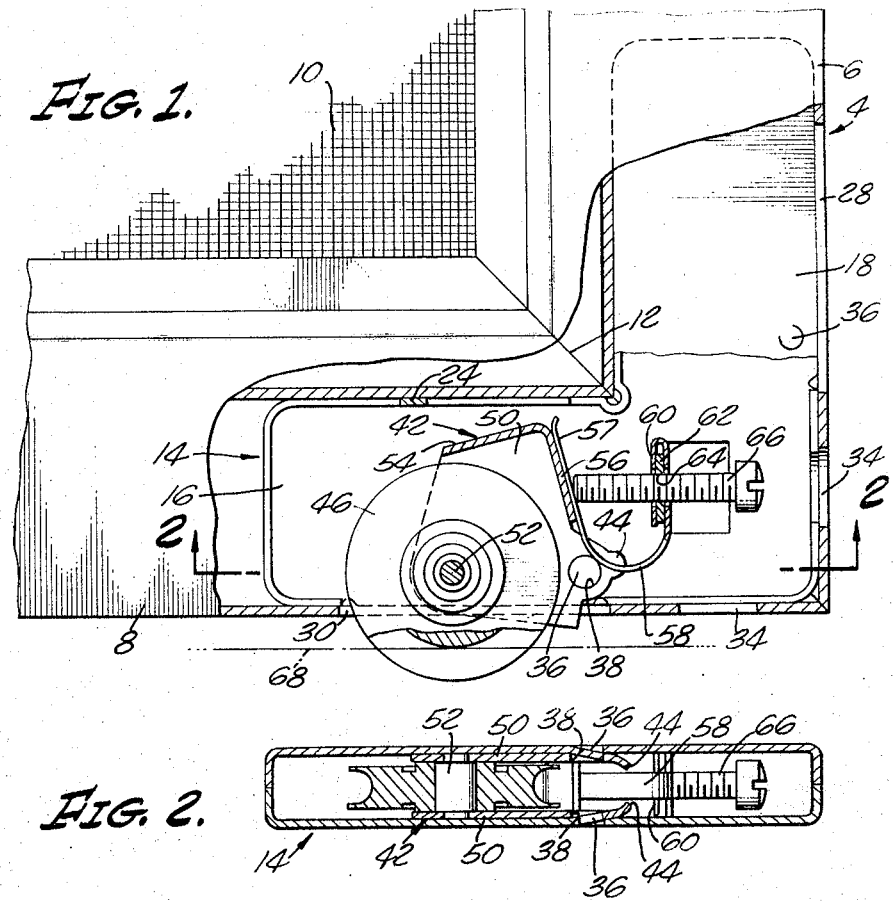
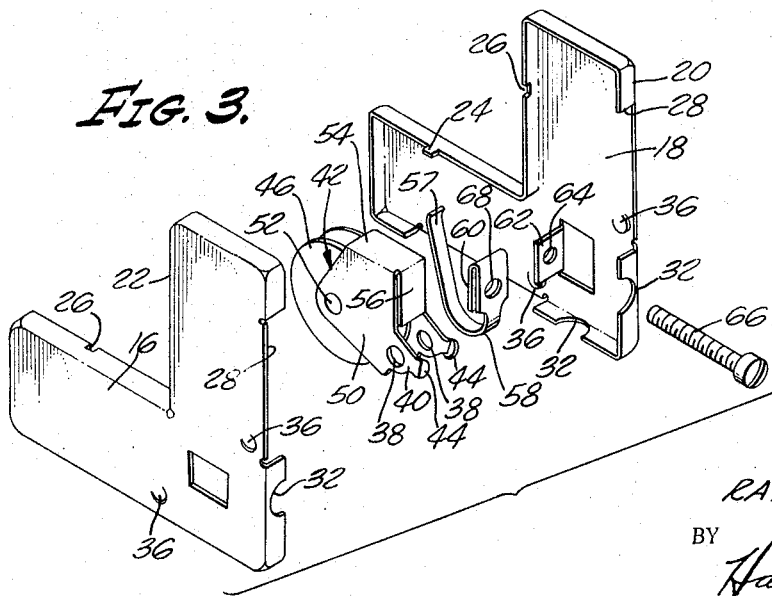
INVENTOR.
RAY N. DUSHANE
BY
Hazard & Miller
ATTORNEYS United States Patent Office 3,299,575
Patented Jan. 24, 1967

3,299,575
COMBINED CORNER AND ROLLER FOR
SCREEN FRAMES
Ray N. Du Shane, Fullerton, Calif., assignor to Universal Molding Co., a corporation of California
Filed Sept. 7, 1965, Ser. No. 485,395
1 Claim. (Cl. 49—420)

This invention relates to screen frame construction and more particularly to sheet metal or extruded frames for sliding screen doors having supporting rollers at the bottom and in most cases guide rollers at the top of the frame.

Conventionally, metal screen frames are roll-formed or extruded into a tubular shape wherein the frame has corner members generally right angular in structure with one each of the two legs of the corner member pressed into the adjacent mitered ends of horizontal and vertical tubular frame portions to hold them together at the corner. Usually rollers are supplied to support the bottom horizontal member and are also provided in the top horizontal member to bear against lower and upper guide tracks.

Heretofore, the rollers have been located in the tubular frame members inwardly from the ends of the horizontal frame portions and also inwardly toward the centers of said frame members from the ends of the inserted corner members. The result is that the rollers are located relatively close together and in the case of relatively narrow door screens, there is a tendency for the entire screen unit to tip longitudinally of the tracks and jam, thus interfering with smooth opening and closing of the sliding screen doors.

It is a general object of the invention to provide a combined corner unit and roller for rolling screen frames which is made up in a single unitary structure and which when inserted in the corner of a screen frame, will locate the rollers at points more nearly beneath the vertical side members of the screen frame. This provides not only quicker and more efficient assembly of the tubular screen frame with the corners and rollers, but also provides a wider roller base for the frame to prevent tilting thereof when it is pushed along the track when being opened and closed.

The above and other objects will more fully appear from the following description in connection with the accompanying drawing, in which:

FIG. 1 is a side elevational view of a corner of a screen frame showing the corner connector member and a roller supported thereby, portions being shown in vertical section;

FIG. 2 is a sectional view taken approximately on the line 2—2 of FIG. 1;

FIG. 3 is an exploded view in perspective of the corner member and roller unit.

There is illustrated a screen frame 4 having a vertical tubular member 6 and a horizontal bottom tubular member 8. Said tubular members 6 and 8 are conventionally rectangular in cross section and provided with means, not shown, for securing screen cloth 10 in the frame. The abutting ends of the tubular frame members 6 and 8 are mitered as at 12 and are connected by a corner member indicated generally at 14, said corner member having legs 16 and 18 extending at right angles and pressed into the respective tubular frame members 8 and 6.

As shown in FIG. 3 the corner members 14 are composed of two halves 20 and 22 which preferably are in many respects of identical construction so most of each of said halves can be made by identical stamping operations. Each of the corner halves 20 and 22 has a projecting lug 24 to fit into an appropriately located notch 26 in the other half to prevent the halves of the corner from relative shifting movement when they are inserted in the tubular frame sections. Said halves of the corner member are provided with elongated cutouts 28 which are indicated in their entireties as a vertically facing aperture 30 in FIG. 1.

Struck inwardly from the halves 20 and 22 of the corner members are smaller rounded roller bracket pivot tabs 36 which are adapted to be received in apertures 38 in any opposite lower side projections 40 of a roller housing or carrier 42. The projections 40 of the carrier 42 have their ends 44 bent slightly inwardly toward each other. The carrier 42 and the roller 46 are not inserted into the corner member 14 until after said corner member is pressed into the adjacent tubular frame members 6 and 8, said roller carrier 42 being inserted into the corner member 14 upwardly through the opening 30 in the horizontal frame member 8 and the inwardly bent ends 44 of the projection 40 on the carrier will slide over inwardly struck pivot tabs 36 and seat in the housing pivot apertures 38.

The housing 42 has spaced sides 50 which support a roller axle 52, said sides 50 of the roller housing being joined by a top portion 54. An end tongue 56 extends downwardly from the housing top portion 54 to provide a bearing surface for one end 57 of a generally U-shaped spring 58. The spring 58 has an end 60 folded over a tongue 62 struck inwardly from one side of the corner member 14.

The spring-supporting tongue 62 is provided with an aperture 64 to receive an adjustable stop bolt 66, or said bolt can be mounted for threaded adjustment by contact of the threads of the bolt with the edges of apertures 68 in the folded portions of the spring 58. The bolt 66 is aligned with the aperture 34 in the side edge wall of the vertical tubular frame member 6 to provide access for a screen driver to adjust the bolt 66.

The spring 58 biases the roller housing 42 and roller 46 in a counter-clockwise direction in FIG. 1 about the pivot tabs 36 which support said roller housing, thereby urging the roller 46 downwardly against a suitable trackway indicated by the broken line 68 in FIG. 1. A corner and roller unit mounted in an upper corner of a screen frame would be in a position inverted from that shown in FIG. 1 so that the roller would be biased upwardly through an upper horizontal screen frame section to yieldably bear against an upper trackway, not shown.

The adjusting bolt 66 can be turned to move horizontally and adjustably limit clockwise swinging of the roller bracket or carrier 42 and roller 46 so that the screen frame 4 can be properly positioned between the lower trackway 68 and a complementary upper trackway.

The roller 46 and its housing bracket or carrier 42 are of such size that the corner leg 16 cannot be inserted in the horizontal tubular frame member 8 with the roller installed in the corner member because of the desirability of providing a roller of a desired maximum size. It is for this reason that the roller housing bracket or carrier 42 and roller 46 are inserted through the screen frame opening 30 after the corner leg 16 has been pressed into the tubular screen member 8.

By duplicating the stampings which makes up the two sides 20 and 22 of the corner member 14, it is possible to use the corner member in any one of the four corners of the screen frame. It will be seen from FIG. 3 that the corner member 14 can be turned 90° clockwise and inserted in the opposite end of the lower horizontal screen frame member 8 and the roller housing 42 and roller 46 then inserted through the elongated opening 28 of the screen member 14. This duplicate construction likewise permits use of the corner member in either of the upper corners of the screen frame as well.

From the foregoing it will be seen that I have provided a screen frame corner member and roller assembly as a unit wherein assembly and adjustment are readily accomplished and the roller is positioned as closely as necessary to the vertical tubular screen frame sections 6 to prevent tilting and jamming of the screen frame when it is pushed on the trackway.

It will of course be understood that various changes can be made in the form, details, arrangement and proportions of the various parts without departing from the spirit of the invention.

I claim:

In a screen frame, a tubular frame having a horizontal section and a vertical section meeting at an angle, the horizontal section having a vertically facing aperture, an angled corner member having legs with spaced side walls and seated in one each of said tubular frame sections, a roller bracket movably carried by said corner member between said side walls and inwardly from the ends of said legs, a roller being rotatably supported by said roller bracket between said side walls and movable vertically with the bracket as a unit relative to said tubular frame and said vertically facing aperture, means carried by said frame for adjustably positioning said roller bracket and roller relative to said vertically facing aperture, and a spring interposed between said corner member and said roller bracket and biasing the bracket and roller away from said means for adjustably positioning said roller and in the direction of said vertically facing aperture.

References Cited by the Examiner

UNITED STATES PATENTS

| | | | |
|---|---|---|---|
| 3,040,391 | 6/1962 | Saunders | 20—19 |
| 3,090,084 | 5/1963 | Banner | 20—19 |
| 3,097,401 | 7/1963 | Riegelman | 20—19 |
| 3,175,255 | 3/1965 | Saunders | 20—19 |

HARRISON R. MOSELEY, *Primary Examiner.*

KENNETH DOWNEY, *Examiner.*